Dec. 11, 1951   M. B. SAMPSON   2,577,858
HIGH-SPEED ROTATING CYLINDER
Filed June 28, 1950
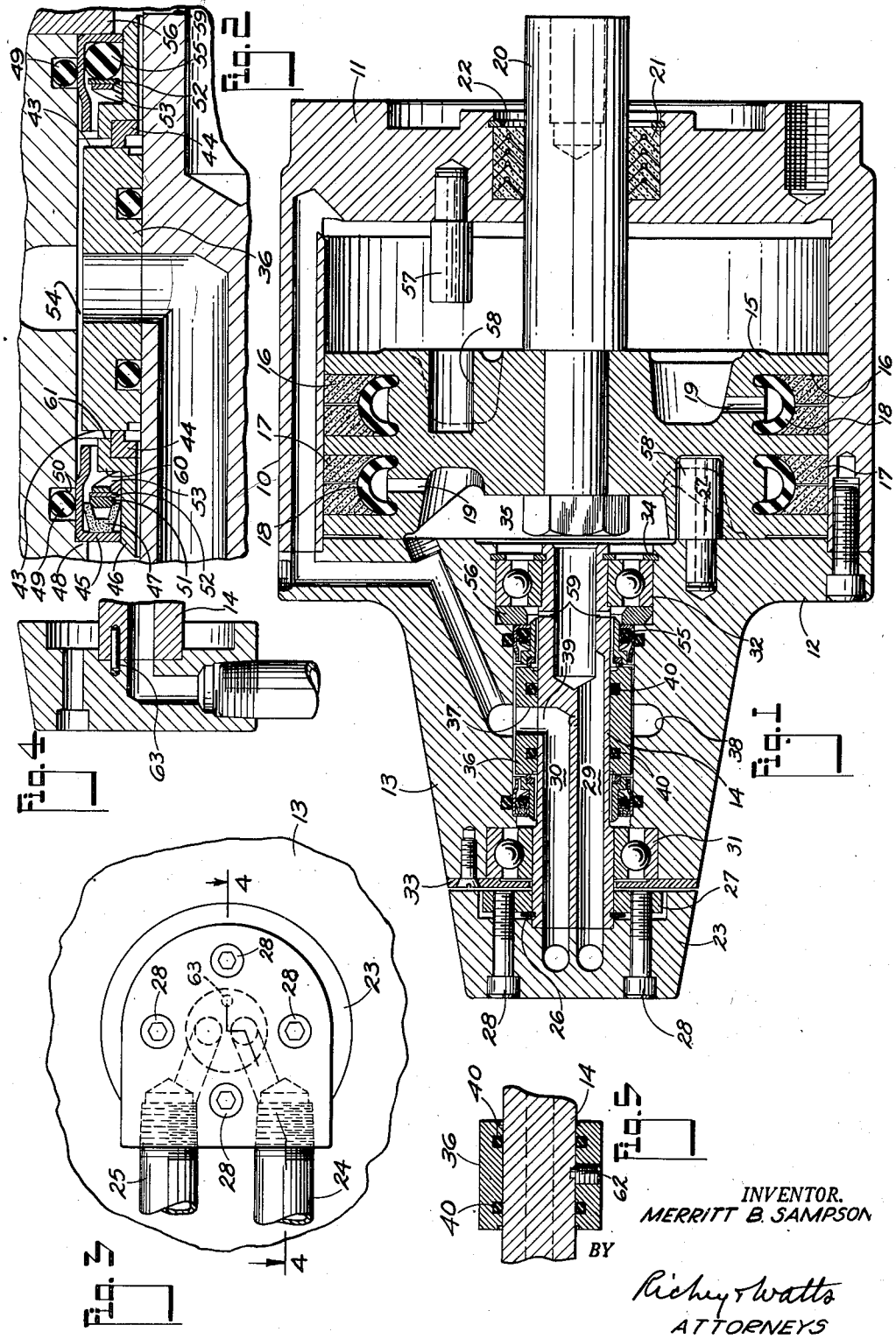
INVENTOR.
MERRITT B. SAMPSON
BY
Richey & Watts
ATTORNEYS Patented Dec. 11, 1951

2,577,858

UNITED STATES PATENT OFFICE 2,577,858

HIGH-SPEED ROTATING CYLINDER

Merritt B. Sampson, Cleveland, Ohio, assignor to The S-P Manufacturing Corporation, Cleveland, Ohio, a corporation of Ohio Application June 28, 1950, Serial No. 170,751

7 Claims. (Cl. 121—38)

This invention relates broadly to rotary air chuck cylinder operating mechanisms and more specifically to the structure and organization of the sealing mechanism embodied therein.

One of the objects of the invention is to provide a novel and efficient seal between a rotary piston cylinder assembly and the fluid transfer passageway in the fixed axial bearing therefor.

Another object of the invention resides in the provision of a sleeve for the cylinder axial bearing tube which is designed for compressive end wall engagement with the rotary sealing rings in the cylinder.

Another object of the invention is to provide a seal between the cylinder and bearing tube therefor which embodies rotary carbon thrust rings urged under fluid pressure into intimate engagement with mating surfaces on the fixed bearing.

Another object of the invention is to provide a sealing structure which will inhibit loss of lubricant from the anti-friction bearings in the assembly.

Another object of the invention is to provide a duct leading from the pressure fluid passageway in the cylinder supporting tube to a seal of the hydrostatic type.

Another object of the invention is to provide a supporting structure for a rotary cylinder piston assembly which embodies a fixed axial bearing member having an air passageway therein and a deformable O ring operating in conjunction with a rotary carbon ring to seal the joint between said bearing and the cylinder during the retraction of the piston therein.

Other objects and advantages more or less ancillary to the foregoing, and the manner in which all the various objects are realized will appear in the following description, which, considered in connection with the accompanying drawings, sets forth the preferred embodiment of the invention.

In the drawings:

Fig. 1 is a longitudinal sectional view through a rotary cylinder assembly for operating an air chuck;

Fig. 2 is a similar sectional view, drawn upon an enlarged scale, of a fragmentary portion thereof;

Fig. 3 is an end elevational view of the cylinder operating mechanism illustrating the arrangement of the fluid couplings;

Fig. 4 is a transverse sectional view of the portion of the operating mechanism shown in Fig. 3, the section being taken on planes indicated by the line 4—4 in Fig. 3; and Fig. 5 is a longitudinal sectional view of a fragmentary portion of the cylinder supporting tube, the section being taken on a plane disposed at 90° to that illustrated in Fig. 1.

Referring first to Fig. 1, the air chuck operating mechanism comprises a cylinder 10 preferably formed with an integral head 11 on one end thereof and a removable head 12 bolted upon the opposed end. The head 12 is formed with a diametrically reduced elongated body portion constituting a hub 13 which is bored through its length for the reception of a fixed tube constituting an axle shaft 14. The cylinder is provided with a piston 15 machined with circumferential grooves 16 therein for the reception of packing rings 17 urged into engagement with the cylinder wall by deformable toric rings 18 which are subjected to the pressure fluid in the cylinder through passageways 19. The cylinder head 11 is bored to receive a piston rod 20 which is drilled and tapped to receive a draw rod, not shown, for actuating the chuck or other mechanism coupled therewith. The outer end of the cylinder head is counterbored for the reception of packing rings 21 restrained against axial movement by a snap ring 22.

The outer end of the axle 14 is mounted in a manifold 23 which may be supported by the pressure fluid conduits 24 and 25 or in any other suitable manner. As illustrated the tube or axle 14 is provided with a snap ring 26 adjacent the outer end thereof which is engaged by a plate 27 drawn into impinged relation therewith by cap screws 28 in the manifold 23. The manifold is drilled to connect the openings for the conduits 24 and 25 with parallel passageways 29 and 30 in the axle shaft 14. The ends of the cylinder head 12 are counterbored for the reception of anti-friction bearings 31 and 32 mounted on the axle shaft 14, the outer bearing 31 being restrained against axial movement by a plate 33 secured to the end of the hub 13 and the inner bearing 32 being locked in place by snap rings 34 and 35 seated respectively in grooves in the cylinder head 12 and axle shaft 14. The portion of the axle intermediate the bearings 31 and 32 is provided with a sleeve 36 having a transaxial bore 37 therein disposed for registration with an annular groove 38 in the head 12 and a port 39 in the axle that communicates with the passageway 30. The sleeve is machined for snug engagement with the axle shaft and the bore therein is formed with a pair of annular grooves adjacent the port 39 for the reception of deformable sealing rings 40 to restrain loss of the fluid in the passageway 30. The sleeve is locked against rotation by a set screw 62, Fig. 5, and the shaft 14 is keyed to the manifold by a dowel 63, Fig. 4. The groove 38 is connected with a passage 41 in the head 12 which communicates with a duct 42 in the wall of the cylinder leading to the outer end thereof. The passageway 29 in the axle shaft terminates in the inner end of the cylinder.

The end walls 43 of the sleeve are ground and lapped to provide smooth accurate bearing surfaces normal to the axes of the shaft 14. The bored portion of the hub adjacent the ends of the sleeve are provided with carbon rings 44 having the inner faces thereof ground and lapped with requisite precision to provide an air-tight seal and full surface engagement with the end walls of the sleeve. The rings 44 are mounted for rotative movement with the cylinder 10, the support therefor comprising generally a cup 45 snugly engaged in the axial bore in the cylinder head, a cylindrical shell 46 mounted in concentric relation therewith and formed for the retention of the ring 44 and a deformable ring impinged between the cup and shell. In the outer seal assembly referred to above the cup 45 is restrained against axial movement by a shoulder 48 formed in the bore of the cylinder head and the engagement of the ring 44 with the end wall of the sleeve 36. The contacting surfaces of the cup and head are sealed by deformable tores or so-called O rings 49 mounted in grooves 50 in the head 12. The sealing ring 47 is of channeled form having a thrust ring 51 backed by a washer 52 intermediate the flanged portions thereof and a fluted annular spring 53 compressively engaged with the washer. The shell is formed for running clearance about the shaft 14 and the diameter of the inner end thereof is proportional relative to the open end of the cup to define an opening for the admission of pressure fluid delivered through a channel 54 communicating with the port 39. The inner seal assembly is of similar form save that the sealing ring intermediate the cup and shell comprises a spring-pressed O ring 55. The cup in this assembly is restrained against axial movement by a thrust washer 56 engaged with the end wall thereof and the outer ball race of the anti-friction bearing 32.

The inner faces of the cylinder heads 11 and 12 are provided with dowel pins 57 disposed for engagement within openings 58 in the opposed faces of the piston. The pins are formed to assure the entry of one thereof within its seat before retraction of the other during the reciprocative movement of the piston.

In operation, when the pressure fluid is admitted to the cylinder 10 through the passageway 29 the piston will be moved toward the cylinder head 11, the fluid seal between the stationary shaft 14 and the cylinder head 12 being effected by the deformation of the O ring 55 under the influence of the fluid passing through the ports 59 in the shaft. During this operative cycle the seal is further effected by impingement of the ring 44 with the wall 43 of the sleeve consequent the fluid pressure upon the flanged portion of the cup 45 and end wall of the shell 46. It will be noted that the ports 59 are disposed adjacent the outer face of the anti-friction bearing 32 in order to equalize the pressure on the opposed face of the bearing and thus avoid the removal of lubricant therefrom. When the fluid is admitted to the opposite end of the cylinder through the passageway 30 and communicating ducts, the piston will be moved toward the head 12, the pressure fluid in the channel 54 effecting a seal between the shaft and cylinder by the deformation of the rings 47 and impingement of the carbon rings 44 with the end walls of the sleeve consequent the fluid pressure on the shell 46. As will be readily seen in Fig. 2 the area of the shoulders 60 in the shell 46 exceeds the area of the forward end walls 61 thereof, hence as the pressure fluid flows into the cups 45, the shells will be biased toward the sleeve and force the rings 44 into intimate engagement and sealed relation with the end walls 43 of the sleeve.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. Mechanism for actuating an air chuck comprising a fixed axle shaft, anti-friction bearings thereon adjacent the ends thereof, a cylinder rotatably mounted thereon having an axial bore therein, a piston in said cylinder, a sleeve affixed upon said shaft intermediate said bearings and in spaced relation with the bore in said cylinder, said shaft having a pressure fluid passageway therein leading to said cylinder rearward said piston, said shaft, sleeve, and cylinder having pressure fluid passageways therein leading to the cylinder forward said piston, seals intermediate said shaft and cylinder embodying cups mounted in the cylinder, shells concentric therewith, rings in said shells engaged with the end walls of said sleeve and deformable rings intermediate said cups and said shells, the rings carried by said shells being urged against the end walls of said sleeve by the pressure fluid entering said cups.

2. Mechanism for actuating an air chuck comprising a fixed axle shaft, anti-friction bearings thereon adjacent the ends thereof, a cylinder rotatably mounted thereon having an axial bore therein, a piston in said cylinder, a sleeve affixed upon said shaft intermediate said bearings and in spaced relation with the bore in said cylinder, said shaft having a pressure fluid passageway therein leading to said cylinder rearward said piston, said shaft, sleeve, and cylinder having pressure fluid passageways therein leading to the cylinder forward said piston, a seal intermediate said shaft and cylinder embodying a cup mounted in the cylinder, a shell concentric therewith, a ring in said shell engaged with the end walls of said sleeve and a deformable ring intermediate said cup and and shell, a shoulder in the portion of the shell within the cup having an area greater than that of the end wall of the shell whereby the pressure fluid in the void between the sleeve and the bore in the cylinder will urge the ring into engagement with an end wall of the sleeve.

3. Mechanism for actuating an air chuck comprising a fixed axle shaft, anti-friction bearings thereon adjacent the ends thereof, a cylinder rotatably mounted thereon having an axial bore therein, a piston in said cylinder, a sleeve affixed upon said shaft intermediate said bearings and in spaced relation with the bore in said cylinder, said shaft having a pressure fluid passageway therein leading to said cylinder rearward said piston, said shaft, sleeve, and cylinder having pressure fluid passageways therein leading to the cylinder forward said piston, a cup in the bore in the cylinder, a concentric shell therein, a deformable ring between said cup and said shell and a carbon ring carried by said shell impinged with an end wall of said sleeve by the pressure fluid in said cup.

4. Mechanism for actuating an air chuck comprising a fixed axle shaft, anti-friction bearings thereon adjacent the ends thereof, a cylinder rotatably mounted thereon, a hub on the cylinder having an axial bore therein, a piston in said cylinder, a sleeve affixed upon said shaft intermediate said bearings and in spaced relation with the bore in said hub, said shaft having a pressure fluid passageway therein leading to said cylinder rearward said piston, said shaft, sleeve, and cylinder having pressure fluid passageways therein leading to the cylinder forward said piston, a seal intermediate said shaft and hub embodying a pair of cups in the bore in the hub adjacent the ends of the sleeve, shells therein, thrust rings supported thereby, a deformable O ring in the cup adjacent the cylinder, a deformable channeled ring in the other cup, springs in said cups urging the deformable rings into seated relation with the end walls thereof, and means for the retention of the cups against axial movement in the bore.

5. In a rotary piston cylinder assembly for actuating air chucks embodying a fixed axle shaft having longitudinal pressure fluid bores therein communicating with the cylinder on either side of the piston, and an axial bore in the hub of the cylinder, a seal intermediate the shaft and the cylinder comprising a sleeve fixed upon said shaft having a cross-bore therein connected with one of said passageways, cups affixed in the cylinder bore circum-ambient the ends of said sleeve, deformable rings in the cups, shells rotatable on the shaft, and carbon thrust rings carried by said shells compressively engaged with the end walls of the sleeve by the pressure fluid in the void between the sleeve and the bore in the hub of the cylinder.

6. A rotary piston cylinder assembly for the actuation of an air chuck comprising a stationary axle shaft, a cylinder rotatably mounted thereon, said shaft and cylinder having pressure fluid passageways therein communicating respectively with the opposed ends of the cylinder, a sleeve on said shaft having a port therein communicating with one of said passageways, and seals between the shaft and cylinder comprising deformable sealing rings carried by the cylinder, shells rotatable on the shaft and engaged by the sealing rings, and thrust rings urged against the end walls of the sleeve by the effort of the pressure fluid on the shells.

7. A rotary piston cylinder assembly for actuating an air chuck comprising a stationary shaft having pressure fluid channels therein, a sleeve thereon having a port therein communicating with one of said channels, a cylinder rotatively mounted on said shaft having an axial bore therein and a passageway communicating with said port and the forward end of the cylinder, deformable sealing rings mounted in said cylinder adjacent the ends of said sleeve, thrust rings adjacent the ends of said sleeve, and pressure fluid actuating means urging said rings into engagement with the end walls of said sleeve.

MERRITT B. SAMPSON.

REFERENCES CITED

The following references are of record in the file of this patent:

UNITED STATES PATENTS

| Number | Name | Date |
|---|---|---|
| 1,284,225 | Bogart | Nov. 12, 1918 |
| 1,934,411 | Dahlman | Nov. 7, 1933 |